United States Patent [19]
Monaghan

[11] 3,840,782
[45] Oct. 8, 1974

[54] MEANS FOR INDICATING CHANGES IN AN ELECTRICALLY CONDUCTIVE PATH

[76] Inventor: Kenneth J. Monaghan, 556 Abbyshire Dr., Berea, Ohio 44017

[22] Filed: Sept. 27, 1971

[21] Appl. No.: 183,824

[52] U.S. Cl. .............. 317/18 B, 317/2 E, 324/51, 340/256
[51] Int. Cl. .......................................... H02h 3/16
[58] Field of Search ....... 317/18 B, 18 C, 18 A, 44, 317/45, 2 D, 2 E; 324/51; 340/256

[56] References Cited
UNITED STATES PATENTS

| | | | |
|---|---|---|---|
| 1,602,993 | 10/1926 | Tinsley et al. | 317/44 |
| 2,880,377 | 3/1956 | Buckingham et al. | 317/18 B |
| 3,426,342 | 2/1969 | Langis | 317/18 B |
| 3,493,815 | 2/1970 | Hurtle | 317/18 A |

Primary Examiner—James D. Trammell
Attorney, Agent, or Firm—Arthur A. March, Esq.

[57] ABSTRACT

This invention relates to electrical path examining apparatus whereby the effectiveness of a closed loop between input and output connections supplying power to energize a load can be determined. An impedance element is included in the path and in the event of any interruption in the conductivity of a grounding circuit between the input and output the current supply is immediately cut off but in the absence of fault conditions continuity of operation is established. The ground connections are established at selected parts of the loop path. The apparatus is such that structural components, which might be subject to fire hazards and explosions during operation, are protected through the control and interruption of the supply at critical periods.

12 Claims, 7 Drawing Figures

INVENTOR.
Kenneth J. Monaghan

BY

ATTORNEY

MEANS FOR INDICATING CHANGES IN AN ELECTRICALLY CONDUCTIVE PATH

This invention relates to electrical means and particularly to a means for indicating changes in an electrically conductive path which may be simultaneously operating as the electrical path of another circuit.

In its broadest sense this invention is directed, but not necessarily limited to, the verification of an effective electrical path to ground. This will test or detect immediately an ineffective electrical path including the nonexistence or even failure of an electrical path to achieve a useful objective. The invention also provides for detecting changes in an electrically conductive path that otherwise might include a diminution of the effectiveness or conductivity of the overall path.

Further than this, the invention is arranged to provide certain control functions which will automatically operate in the event of failure of an electrical path or which will function at a preselected point of change, including some predetermined point of diminishing effectiveness of that electrically conductive path. In one particular form of the invention consideration has been given to the obtainment of adequate grounding of an electrical condition which, if unattended, could lead to the serious damaging of electrical equipment or even injury or shock to personnel operating such equipment.

In electrical circuitry a grounding system is practically essential to ensure a limiting of voltages and in order to carry currents to ground during fault conditions. Voltage limitations effective within circuitry depend upon the method of grounding the system neutral and on the continuity of the ground return circuitry. Such circuitry tends to determine the path over which fault current will flow and regardless of how grounding is brought about it is almost essential that some suitable path be provided for fault current if hazardous voltages are to be avoided during fault conditions.

In most installed electrical circuitry provisions are made in the installation for ensuring that proper grounding can be obtained. This is often done by providing, particularly in the case of large buildings, for a grounding of the structural framework so that, in the event of fault or lightening disturbances, for instance, currents will be certain to pass directly to ground without damaging equipment or without the injury of personnel present within or operating the structure. In other systems where current is passed through conductors leading to equipment much thought is given to the provision of a third grounded conductor to which a connection must be established prior to connection of the equipment to be utilized.

It is now recognized widely and established by findings of the National Commission on Product Safety, which was reported some short time ago to the President and to the Congress, that many of the hazards which were present in connection with the operation of power tools and which resulted, for instance, in various shock conditions from a sudden fault, that a grounding system was far more important than was a double insulation system. This effectively provides a "lightening rod" which would carry off a charge but would function only in cases where the operating plug condition was connected in some way to establish a ground connection. Further than this, many manufacturers of equipment, and particularly those in power tool and hospital supply field, have recognized that new technologies must be developed to meet the needs of those working directly with the equipment involved, thereby to avoid the personal and equipment hazards which could otherwise result.

The dangers above suggested are so well recognized that the National Electrical Code states while resistance to ground for greatest safety should be of the order of 1 ohm or less the code is actually slightly more liberal in that it requires that electrodes, where practicable, shall have a resistance to ground which does not exceed 25 ohms. It also points out that wherever the resistance is not as low as this value safety provision indicates that two or more electrodes connected in parallel shall be used. Further than this, the same electrical code recommends in connection with certain handheld electrical apparatus that such apparatus should be connected to ground by a metallic connection. Further than this and particularly in connection with the fueling of aircraft or trucks and the like significant electrical charges tend to build up in the operation. Such charges may also build up while the aircraft is in flight. To prevent fires and explosions due to such static charges which would cause discharge arcs which could ignite fuel or other flammable material it is essentil that the aircraft or similar structure must be kept at a common electrical potential. Often times, in connection with aircraft where the problem can be particularly severe, so-called "bonding" wires or straps are attached between individual control surface members and the main aircraft structure. Even with such precautions it has been found that these bonding wires haphazardly break and the breakage is not always immediately detected because many of them are hidden internally in the structure and not easily observable. Control surfaces of aircraft which are particularly subject to the building up of static charge are the ailerons, the flaps, the elevators, the rudders, trim tabs and the like.

Present day jet airliners have many such bonding wires and in servicing the equipment it is not always practical to check each bonding wire prior to flight so that often times the aircraft fly with some bonding wires broken. This of itself offers almost an open invitation to fires and explosions while the craft is in flight. This invention is intended to offer marked aid in avoiding such hazards and also makes practical the monitoring of aircraft bonding wires during flight, so the air crew can be altered whenever verified bonding ceases.

The present invention seeks to make practical the examination and monitoring of an electrically conductive path to ground at all times. This will safeguard not only property or other equipment but also protects humans against hazards which can arise from the use of electric power and electrostatic charge accumulation. The present invention provides an electrical ground path examination application where one grounded segment can be of any desired form but particularly the soil of the earth.

Oftentimes surges on power lines or excess currents can be handled by fuses but this is not always a particularly satisfactory way in which to operate. In the case of an alternating current supply line, which is supplying, for instance, current at a voltage of illustratively 440 volts it might be common practice to fuse this line with fuses operating at 100 amperes. Let it be assumed however that a 5 ohm ground resistance existed if a fault appeared on such a line condition the resulting current flowing would be 88 amperes and, of course, no fuses would blow. Therefore the system as a whole would be 440 volts above ground. This could be hazardous both to man and equipment. It is with this thought in mind that conditions such as the foregoing can be and are overcome by the invention herein to be described.

In the invention to be described the aforesaid hazardous consitions are cared for and the effects thereof eliminated be electrically examining an electrical path while it is part or all of a closed loop structure. The results of the examination then can be used to provide the control and at the same time erroneous or disguised conditions are avoided by having only two segments of the closed loop junction at any one common point. The closed loop can be electrically isolated and free of temperamental components and can include a fuse. The electrical examinatin power in the closed loop can be at levels below that which will produce sparking. Equal quantities of positive polarity and negative polarity electrical examination energy can be used to avoid having the electrical examination circuit energy contribute to electrolysis corrosion in the closed loop. A method of achieving this, is the use of, but, not limited to the use of, alternating current.

In any operation of this character one of the problems which must be dealt with is that of corrosion. Corrosion is a serious problem particularly in any large grounding systems. If, for instance, ferrous metals are used to establish the ground connection it has been found that whenever such metals contact moist soil conditions, or even water, forces which must be released are found to exist and these forces must be released. When these conditions do exist the result is that the effect tends to combine with oxygen to form oxides. The result is both rusting and galvanic corrosion, each of which is extremely hard to deal with in any instance.

Corrosion is primarily a continuous electrochemical process. It results in the destruction of metals. It also occurs when different metals come in contact with one another or where the ground connection is made to different soil compositions or for various other reasons. In any event corrosion usually exhibits itself in the form of galvanic or electrolytic action. It is usually caused by direct current from an external source being impressed on a buried conductor or by the fact that there is a substantial increase of surface resistance between the grounding element and the ground connection.

The invention herein to be described makes practical the examination and monitoring of an electrical path to ground in fashipns and with an efficiency not heretofore achieved.

Thus, the objects of the invention include, but are not limited to, safety features which can readily be incorporated in electrical circuitry at nominal costs and which will provide a practically instantaneous disconnection of power under conditions of fault and yet which enable the system essentially to operate in the absence of fault conditions in the same fashion as would be experienced without the inclusion of the safety features here disclosed.

Another object is that of providing a sensing circuit which can readily be isolated and grounded and which comprises essentially of a pair of connected transformer coils operating an alternating polarity electrical pulses to overcome the damaging effects of direct current voltages in the circuit which would otehrwise as above explained, result in corrosion and the damaging effects on the apparatus.

A further object of the invention is that of providing simple circuitry which will permit the detection of directional conductivity differences.

Various forms of the circuitry may be adopted within the scope of this disclosure and the appended claims and for an illustration of the invention in its preferred forms reference may be had to the accompanying drawings in which:

FIG. 1 is both a schematic and a typical ground path verification circuit effectively to illustrate in principle the circuit conditions here to be dealt with;

Figure 1:
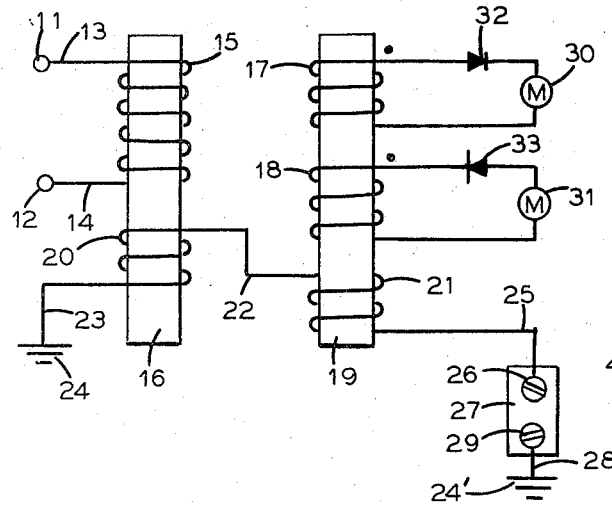

Now making reference to the drawing for a further understanding of the invention and a system for the examination of an electrically conductive path reference may be made first to FIG. 1. In this figure energy of alternating polarity electrical pulses of selected frequency, say illustratively, those such as 25, 50, 60, 120, 400 and so on Hz. may be supplied at input terminals 11 and 12 and by way of conductors 13 and 14 to the primary winding 15 of an "input" transformer. This transformer winding is wrapped about a magnetizable core 16. The secondary or output section of a second transformer may comprise a pair of windings 17 and 18 which are connected to wrap about a further mangetizable core 19. A sensing circuit comprising windings 20 and 21 connected by the circuit element 22 is wrapped about the same magnetizable elements 16 and 19.

The winding 20, for instance, connects via a conductor 23 to a firm ground point 24. This ground may be embedded in the earth and separated from the apparatus as abovenoted. Winding 21 connects by way of conductor 25 to a terminal 26 of a generally similarly grounded object 27. The grounding of object 27 is achieved through connection of conductor 28 to terminal 29 at one end and to a ground point 24' at its opposite end. Obviously object 27 is also connected to ground 24.

Useful output of the circuit is determined by connecting the secondary windings 17 and 18, illustratively, to meters 30 and 31 through some form of rectifying device such as the indicated diodes 32 and 33 with one diode having its anode element connected to the polarized end of one winding and the other diode having its cathode connected to the polarized end of the other winding. The opposite electrode of each diode 32 and 33 then may be assumed to connect to the output elements 30 and 31 which have their other terminal connected to the free terminal of the transformer secondary. The combination of the windings 20 and 21 together with the ground connections passing through the grounded object 27 form a closed loop which is electrically isolated and free of the components above noted.

As is evident, the electrically conductive path which is being examined must be part or all of the closed loop. In some instances part or all of the closed loop may be simultaneously operating as the electrical path of another circuit, as more particularly illustrated by FIG. 1a. In this circuit of FIG. 1a the components which form the essence of this invention may be assumed to be includes within the dotted line rectangle 41. In this figure the electrically conductive path being examined will then form a part of the closed loop 42. This, in turn, may be operated simultaneously as the electrical path of another circuit 43 and 44. For illustrative purposes the closed loop 42 can be assumed to have connected in series with it a power source conventionally shown at 45 (here for convenience sake all of the usual regulating circuitry has not been illustrated) as well as an optional fuse element 46 and a load 47, assumed to be something such as a lamp, meter, meter relay, loud speaker coil, relay coil, heater, transformer winding or any other electronic circuit which may or may not include amplifiers or null detecting or other comparison circuits.

To avoid any erroneous or disguised conditions, such as corrosion due to circuit connections, only two segments 48 may be junctioned at any common point 49 of the closed loop. This will ensure that each segment 48 and its two junction points 49 are effectively examined. Any changing conditions which might arise in the closed loop electrical path 42 which might be even a change in resistance as small as a fraction of an ohm can be detected by using suitable sensing means. The closed loop 42 electrical examination power can be selected to meet whatever requirements are necessary. For instance, dry circuit electrical power levels of less than 0.03 volts with a current flowing of less than 200 milliamperes can be used for such examination. This will permit detection of most oxides, sulfides and surface films without breaking through, the film, although in some applications higher electrical levels can be used if necessary or if it is desired that there shall be a breakthrough of the film. This examination circuit can also operate well below any spark producing levels and as illustrated particularly by the showing of FIG. 2 of the drawings it can be optionally located within an explosion-proof enclosure 50.

Figure 1A:
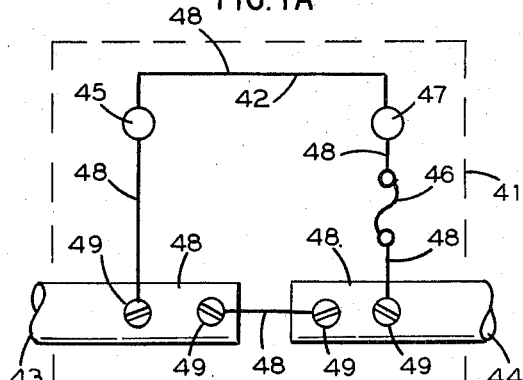
FIG. 1a shows an adaptation of the circuitry of FIG. 1 to illustrate more particularly how the closed loop path thereof may be utilized.

If the FIG. 1a circuit were a direct current variety there would exist the strong possibility of electrolysis and corrosion, as above explained. This would manifest itself particularly at such junction points as at points 49. Consequently a direct current electrically powered examination circuit is rarely desirable since it might well contribute to changes in the electrical path conductivity. On the other hand if electrolysis is to be avoided this can usually be done by reversing the electrical polarity as by an alternating current and this normally can be expected to result in the elimination of any contribution to corrosion due to electrolysis. In order to examine the electrical path it is necessary to bear in mind that electrolysis and corrosion can also be caused by thermocouple and galvanic action but in accordance with the closed loop path 42, as in FIG. 1a, it will be appreciated that one of the applications of the invention would be the detection of corrosion and another would be the detection of any direct current electrical flow.

Figure 2:
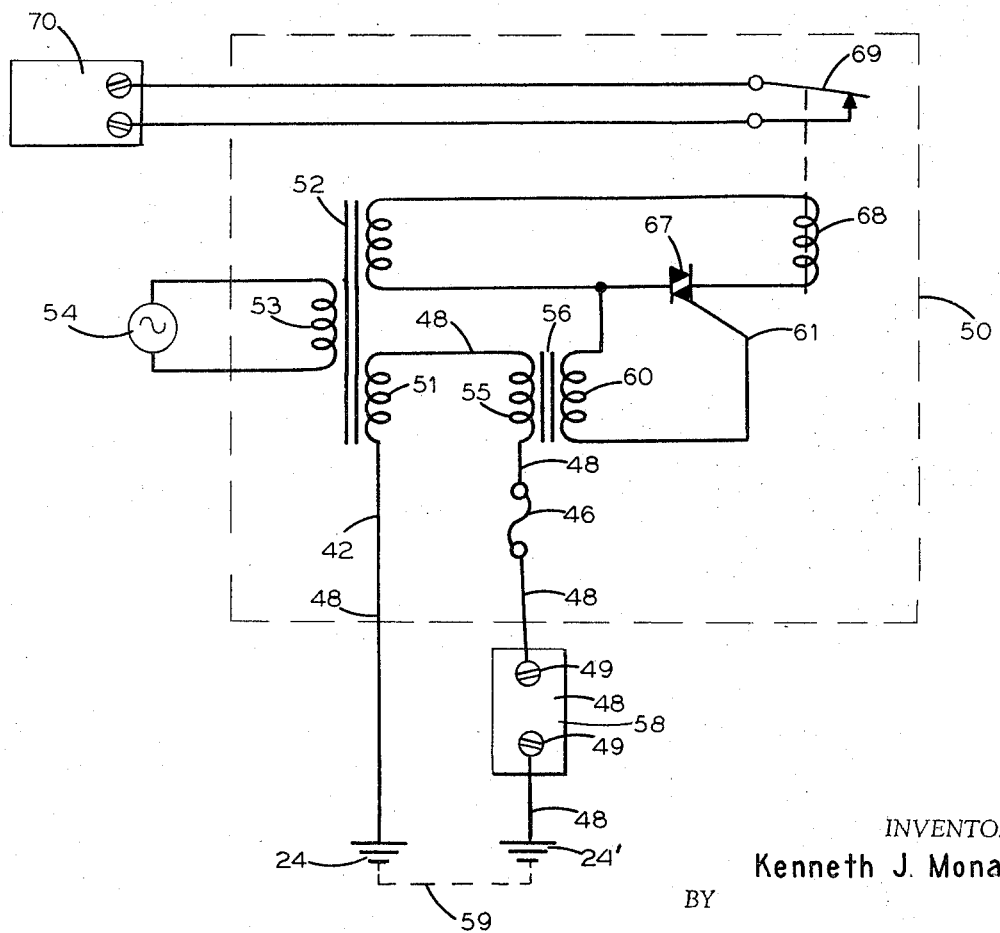
FIG. 2 is an adaptation of the circuitry of FIG. 1 but adds thereto connections to show a particularly practical operation and use of the circuit output.

In the operation of a circuit of the type illustrated by FIG. 2 alternating power and polarity electricity permits the closed loop 42 to use as an electrical examining power source the secondary winding 51 of an input isolation transformer 52, analogous to the transformer 16 of FIG. 1, having the input winding 53 and an assumed input a.c. power source 54. Output isolation is also possible. Illustratively, an assumed load conventionally designated at 55 might be a loud speaker coil, a relay coil or even the primary winding of an output isolation transformer 56. This is an alternating polarity circuit which permits a broad selection of operating voltage levels, impedance matching and the capability of eliminating temperamental components in the closed loop circuit 42 which therefore can be made virtually impervious to shock, vibration, humidity and temperature. The windings 51 and/or 55 then can be used to increase substantially the impedance to fast rise time electrical spikes (for instance, lightning discharges) which otherwise might be damaging.

Considering further the showing of FIG. 2 the closed loop path 42 and the components therewith associated are numbered in accordance with the numbering of FIG. 1a. This circuit however illustrates a typical electrical path examination system and confirms the fact that the object 58 is effectively grounded through a low resistance electrical path. The grounds shown for instance at 24 and 24', as already explained, are located at two separate and distinctly different ground points which form part of a meaningful closed loop 42 which is an electrically conductive path with one segment 59 (for instance soil) unquestionably grounded. The output isolation transformer 56 has its output winding 60 arranged to handle a variety of loads 61. Typically it might be pointed out that the load 61 can be a lamp, a meter, a meter relay, a relay coil, a loud speaker coil or an electronic circuit which can include amplification, as well as bridge networks or other detecting or comparison circuits including circuits for the detection of the flow of electric power fault currents.

As further illustrated by the showing of FIG. 2 in some applications the load 61 can simply be the gate of a triac 67 which then can control a relay coil 68 in the fashion indicated. If a truly effective ground exists electrical power can become available through the relay contacts 69 which will be closed with energization of the winding 68. If however the electrical path to ground becomes ineffective or interrupted for any cause such as for instance a broken ground wire the relay winding 68 is immediately deenergized with the result that the relay contacts 69 will open and thus instantly disconnect power to an assumed load 70. Here however it must be assumed also that the same action could occur if the indicated fuse 46 were to "blow."

Although, as above pointed out, the primary purpose of this invention is to verify rather than to establish an electrical path the closed loop 42 of this figure provides what might be considered redundant grounds 24 and 24' protection even when the verification circuit is not operating. Regardless of this fact however it is well to note that in the National Electrical Code it is stated that made electrodes should, where practicable, have a resistance to ground not to exceed 25 ohms. However, where the resistance is not as low as 25 ohms two or more made electrodes may be connected in parallel as has already been pointed out. Typically speaking two parallel made electrode rods spaced 5 feet apart in the soil, for instance, will generally reduce the esistance to about 65 percent of what one single rod would be. In an alternating polarity examination circuit directional conductivity difference in the closed loop 42 constituting the electrically conductive path can be detected by sensing across the load on the output transformer having a primary winding 55 and a secondary winding 60 using diodes to permit detection of any voltage amplitude differences between the two electrical polarities.

Figure 3:
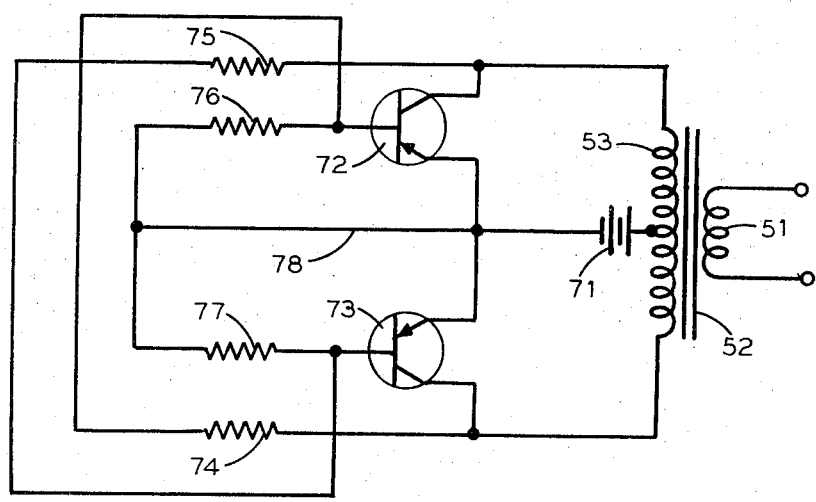
FIG. 3 is an illustration of one form of oscillator circuit suitable for use in connection with the invention set forth.

It will immediately be recognized that a vehicle having rubber tires, for instance, represents a typical example of an electrically isolated electrically conductive object. However the closed loop circuit disclosed and discussed in connection with FIG. 1a can be used positively to verify that such object, like a gasoline truck for instance, is positively grounded through a low resistance electrical path to ground. If such a type of application is to be considered it may be desirable to provide a battery operated or powered alternating polarity examination circuit. This effect can readily be achieved if the input isolation transformer 52, for instance, has its input winding 53 made a part of the typical oscillator circuit, as shown by FIG. 3. The other components of this circuit are generally well recognized and include the usual potential source 71 having its positive terminal for instance connected to the center tap of the winding 53 and its negative terminal connected to the emitter electrode of each of the transistors 72 and 73. The collector electrodes of the transistors are then connected to the outer terminal of the winding 53. There is a cross connection betwen the base of the transistor 72 and the collector of the transistor 73 by way of the indicated conductor and resistor 74. A similar connection is made between the base electrode of the transistor 73 and the collector electrode of the transistor 72 through the resistor 75. As can be expected the base electrodes of the two transistors connect to each other through resistors 76 and 77 which at their junction point connect to the emitters through the conductor 78.

In the showing of FIG. 2 the output isolation transformer 56 having the output winding 60 as already explained can handle a wide variety of loads as discussed with respect to the typical load assumed at 61. There it was also pointed out that this load can be simply the gate of a triac 67 used to control the relay coil 68. A typical form of load has been shown in FIG. 4 where the schematically represented aircraft 80 can be assumed as being refueled by the supply truck schematically represented at 82. This represents, illustratively, a hazardous situation unless it can be assumed that each of the airplane and the fuel truck are at identical ground potentials. The feed between the fuel truck and the airplane is assumed to flow through the schematically illustrated tubular connection 83 in the form of a refueling hose but as it flows it can generate substantial electrostatic charges. In this figure the electrically conductive loop path which has already been discussed and which permits verification of the existence of effective electrical grounding can readily be used.

Figure 4:
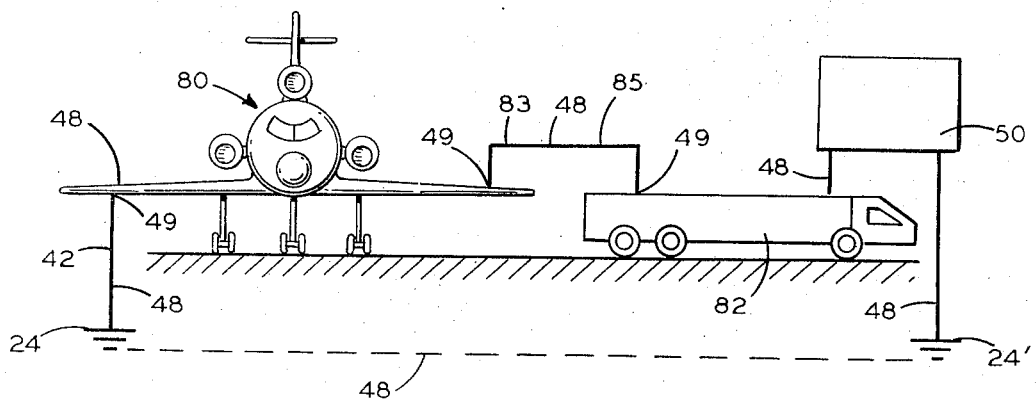
FIG. 4 is a schematic illustration showing the application of the invention to safeguarding fueling operations in respect of aircraft in a fueling process.

An insulated bonding conductor 85 can establish an electrically conductive path between the aircraft 80 and the tanker truck 82. This insulated bonding wire or conductor 85 can be a part of the refueling hose 83 as is illustrated and indicated on this figure. In this showing any electrically conductive parts, for instance the refueling hose couplings, should individually become segments 48 of the closed loop 42. Further than this, FIG. 4 illustrates the examining circuit as being contained in explosion-proof enclosure 50, as in FIG. 2. For the sake of clarity this circuit is shown only schematically as enclosure 50 in FIG. 4 although it should be understood to encompass the features of the FIG. 2 to form a part of a structure such as the truck 82 or the aircraft 80. The examination relay contacts 69 can be used to control the fuel pump motor and pumping equipment so as to allow fuel to be pumped only when a verified closed loop condition 42 exists.

To verify the existence of an effective electrically established path to ground the system of the type shown by FIG. 4 for instance can be used in most refueling areas. It can also be used in conjunction with the chute grounding in grain elevators and illustratively also on electrostatic painting equipment. In this last instance it will particularly verify full compliance with Article 516-5(c) of the National Electrical Code of 1968 which states:

"The handle of the spraying gun shall be electrically connected to ground by a metallic connection and be so constructed that the operator in normal operating position is in intimate electrical contact with the grounded handle. This requirement is to prevent buildup of static charge on the operator's body."

It can be appreciated also that aircraft acquire significant electrical charges as has already been inferred particularly while in flight. To prevent fires and explosions due to static discharge arcs igniting fuel or other inflammable material the entire aircraft structure must be kept at a common electrical potential. While this in the past has been done by bonding wires of the type already described such wires have great tendency to break with resultant increased electrical hazards which the invention here disclosed readily avoids and makes the complete system quite strong.

Figure 5:
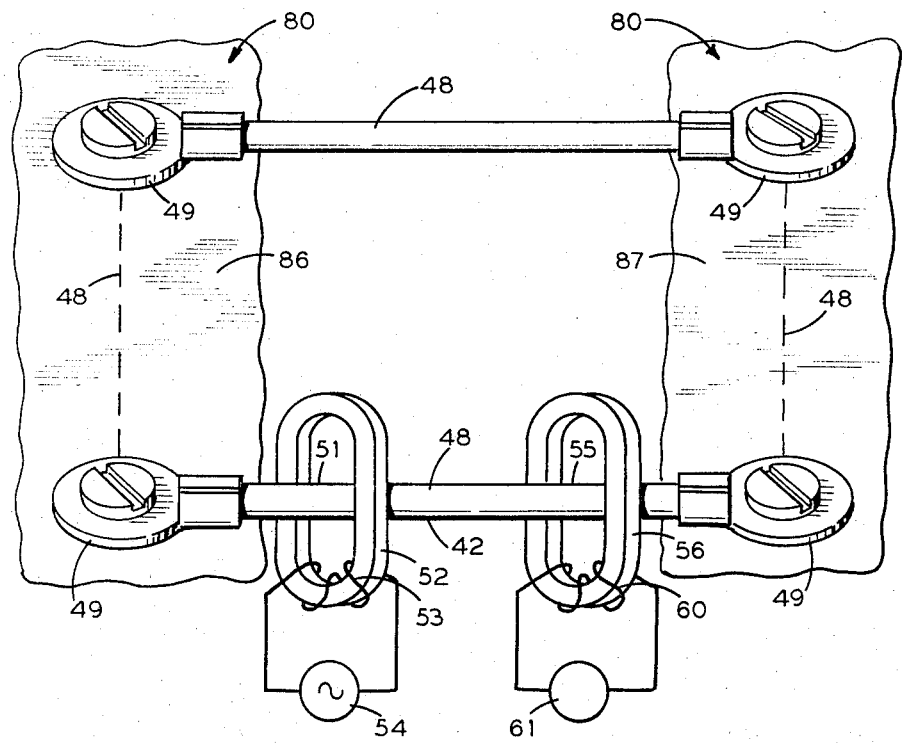
FIG. 5 shows the details of the arrangement utilized in connection with verifying the existence of effective control surface bonding wires, for example, in an airplane prior to and during each flight.

Considering the showing of FIG. 5 closed loop path 42 and components therewith associated are numbered in accordance with the numbering of FIG. 2. A typical insulated bonding wire such as are used on aircraft 80, is shown as a segment 48. One end of the insulated bonding wire is attached to the main aircraft structure 86 and the other end is attached to a control surface 87 in an effort to keep the main aircraft structure 86 and the control surface 87 at a common electrical potential, thus avoiding differences in electrostatic charge accumulations and possible resultant discharge arcs. Each control surface 87 on the aircraft 80 usually has several (for example, five or six) such bonding wires autonomously (individually) mounted to electrically connect the control surface 87 to the main aircraft structure 86. Insulated bonding wire segment 48 can actually become, and is in FIG. 5 shown as, a single turn winding 51 at the point where it passes through core 52 and a single turn winding 55 at the point where it passes through core 56. Windings 51 and 55 can individually consist of one or more turns, depending upon the application requirements. If one (or more) autonomously mounted other insulated bonding wire(s) is functional, it too will become a segment 48 of closed loop 42, as will the section of the control surface 87 and the section of the main aircraft structure 86 between the associated, but, autonomously mounted insulated bonding wire(s) 48. The examination circuit will then be able to verify the existance of (at least) two low resistance electrically conductive paths between any specific control surface 87 and the main aircraft structure 86. Alternately, one bonding wire segment 48 can pass through magnetizable core 52 and one or more bonding wire segments 48 used in conjunction with the same control surface 87, can each pass through a magnetizable core 56, thereby making it possible to examine the effectiveness of virtually any number of bonding wire segments 48.

At the same time the system here disclosed can provide positive identification of the electrical examining circuit if required. This can be done in several ways including the use of a selected examining frequency and by having the output winding 60 (as in FIG. 2) feed into a matching bandpass filter circuit. Such an examining circuit can contain various audio, analog, digital or other forms of coded information which need not here be discussed although it will be appreciated that such arrangements can and do facilitate additional control or monitoring functions.

Thus it is possible with the use of the present invention to detect fault currents in the flow of electric power and to provide actions to control and remedy such faults.

Figure 6:
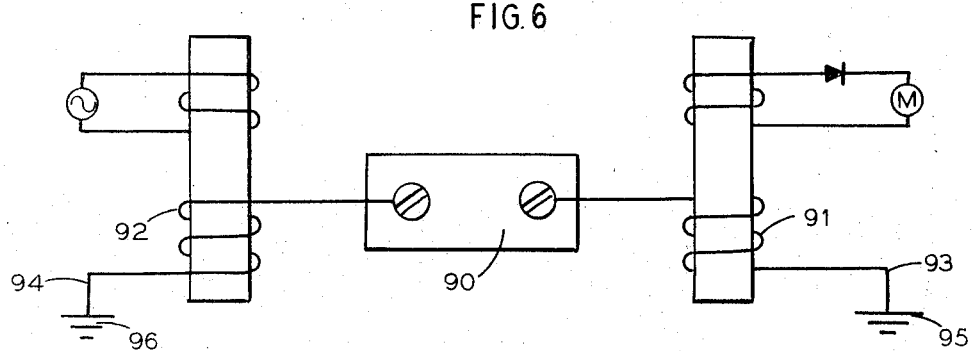
FIG. 6 is a schematic illustration of another arrangement of the closed loop path in which the object to be grounded is located between the windings which lead to ground.

Within the scope of the invention is the modification shown in FIG. 6 wherein the object 90 is disposed between the windings 91 and 92 both of which have leads 93 and 94 to ground 95 and 96. The windings together with the ground connection passing through the grounded object also forms a closed loop which is electrically isolated and, in the manner described aforesaid, the existence of the appropriate ground may be readily verified.

While the invention has been described in detail to facilitate an understanding thereof, it will be understood that this description is not intended to limit the invention. Variations and modifications may be made by those having skill in the art within the scope of the appended claims.

What is claimed is:

1. Electrical path examination apparatus for establishing the effectiveness of a closed loop between input and output connections respectively to supply power and energize a load which comprises
   an impedance element between the said connections,
   said impedance element forming a part of a closed loop electrical path,
   a ground conductive circuit element connected to be energized from the impedance element in parallel with the closed loop,
   means to connect a load circuit between the input and the output and to supply current to the load through the impedance, and
   means to cut off the current supply to the load in the event of an interruption in the conductivity of the grounding element.

2. The electrical apparatus claimed in claim 1 comprising, in addition,
   means to utilize the impedance element as a portion of an alternating current circuit, and
   means to rectify the alternating current prior to energizing the load, whereby with current conversion to direct current the grounding substantially eliminates the effects of thermocouples and galvanic actions contributing to corrosion in the circuit components.

3. The electrical apparatus claimed in claim 2 comprising, in addition,
   means to detect supplied alternating currents regardless of the input frequency thereof, and
   means to obtain ground verifications by way of the grounding circuit connected to the output object.

4. The electrical apparatus claimed in claim 2 comprising, in addition,
   means to connect the load to a remote ground so that an effective electrical ground path exists.

5. The electrical apparatus claimed in claim 4, comprising, in addition,
   means to utilize the impedance elements as a portion of an alternating current circuit,
   means to rectify the alternating current prior to feeding the load, whereby with current conversion to direct the grounding substantially eliminates the effects of thermocouples and galvanic actions contributing to corrosion if the circuit,
   means to provide an output to a plurality of separated and different load regions of a conductive unit, and
   means provided by the grounding connections to distribute and equalize any charges at substantially all areas of the supplied unit.

6. The electrical apparatus claimed in claim 4 comprising, in addition,
   means to utilize the impedance elements as a portion of an alternating current circuit,
   means to rectify the alternating current prior to feeding the load, whereby with current conversion to direct current the grounding substantially eliminates the effects of thermocouples and galvanic actions contributing to corrosion in the circuit components,
   means to control the fueling supply of a component from a supply source which are each normally insulated from ground, and
   means to connect the said apparatus so that a grounding connection is established to each of the supplied component and the supply source thereby to preclude the accumulation of static charges in the supplied component.

7. A system to sense changes in an electrical path comprising
   input means to establish a connection to a power source,
   an isolated sensing circuit including a pair of coil elements adapted to be energized when a power source is connected to the input means,
   means to connect a load circuit and to supply thereto output energy from one of the coil elements,
   means to connect the system as at least a part of a closed loop path,
   means to establish ground connections at selected parts of the loop path, and means to establish substantially effectively instantaneous disconnection between any source connected to the input means and any connected load at times when a fault condition arises and which, in the absence of a fault condition, provides continuous operation.

8. Electrical path examination apparatus for establishing the effectiveness of a closed loop for maintaining the main structure and component sections of an aircraft at a common electrical potential to avoid differences in charge accumulations at one part relative to another part which comprises bonding conductor means to connect component sections to the main structure impedance elements in the form of magnetizable cores between the said parts and main structure, said bonding means being positioned through said cores, a winding about each core, said means and windings forming a part of a closed loop electrical path, means to energize the windings, and means to cut off the current supply in the event of an interruption in the conductivity of the bonding means.

9. Electrical path examination apparatus for establishing the effectiveness of a closed loop for maintaining the main structure and component sections of an aircraft at a common electrical potential to avoid differences in charge accumulations at one part relative to another part which comprises bonding conductor means to connect sections to the main structure, impedance elements in the form of magnetizable cores between the said parts and main structure, said bonding conductor means being positioned through said cores forming a part of a closed loop electrical path, a winding about each core, means to energize and check the windings when the aircraft is grounded after being serviced and fueled and general charge accumulations have been dissipated to the ground, and means to alert the service men in the event of an interruption in the conductivity of the bonding means.

10. Electrical path examination apparatus for establishing the effectiveness of a closed loop for maintaining the main structure and component sections of an aircraft at a common electrical potential to avoid differences in charge accumulations at one part relative to another part which comprises bonding conductor means to connect sections to the main structure, impedance elements in the form of magnetizable cores between the said parts and main structure, said bonding conductor means being positioned through said cores forming a part of a closed loop electrical path, a winding about each core, means to continuously energize the windings while the aircraft is airborne and its component parts are in continuous use, and signalling means positioned in the aircraft to alert the aircrew to any interruption in the conductivity of any of the bonding means.

11. Ground conductive elements forming part of a crossed loop electrical path separate from the load circuit and means to connect said elements to be energized by the load circuit, means for indicating a diminishing conductivity in the closed loop circuit, means to prevent erroneous verification by ensuring that two segments only of the closed loop junction at any one common point, a.c. energizing means to minimize corrosion to the grounding elements of the closed loop, means to connect the load to a remote ground so that an effective electrical ground path exists, means to provide an output to a plurality of separated and different load regions of a conductive nature, and means provided by the grounding connections to distribute and equalize any charges at substantially all areas of the supplied unit.

12. Electrical path examination apparatus for establishing the effectiveness of a closed loop circuit between input and output connections respectively to supply power and energize a load circuit comprising, means for indicating a diminishing conductivity in the closed loop circuit, means to prevent erroneous verification by ensuring that the segments only of the closed loop junction at any one common point, a.c. energizing means to minimize corrosion to the grounding elements of the closed loop, ground conductive elements forming part of a closed loop electrical path distinct from the load circuit, an independent current source, means to connect the said elements to be energized by said independent source, means to connect the load circuit between the input and the output and to supply current to the load, and means to cut off the current supply to the load in the event of an interruption in the conductivity of the parts of the closed circuit, means to connect the load to a remote ground so that an effective electrical ground path exists, means to provide an output to a plurality of separated and different load regions of a conductive nature, and means provided by the grounding connections to distribute and equalize any charges at substantially all areas of the supplied unit.

* * * * *